United States Patent Office 3,425,707
Patented Feb. 4, 1969

3,425,707
SKI SLED
Kotaro Horiuchi, Hamamatsu-shi, and Akira Takeshige, Hamana-gun, Shizuoka-ken, Japan, assignors to Nippon Gakki Seizo Kabushiki Kaisha, Hamamatsu-shi, Japan
Filed Feb. 14, 1967, Ser. No. 616,076
U.S. Cl. 280—16                 14 Claims
Int. Cl. B62b 13/04

ABSTRACT OF THE DISCLOSURE

A ski sled is provided wherein a main body is formed with an inverted U-shaped cross-section and includes a front portion, a middle portion and a rear portion. The front portion supports a steering shaft at the bottom of which is located a front ski. Between the front portion and the rear portion of the main body is located a runner which is below and generally parallel to the middle portion. The runner is connected to the front portion by a flexible plate and is connected to the rear portion by a leaf spring. This provides for a substantially constant attitude of the rider to the steering mechanism, while at the same time provides for substantially cushioning against shock, thus contributing materially to the comfort and control of the rider.

---

The present invention relates to a ski sled of the type in which the rider sits astride the sled. It is ordinarily used by fitting thereto a front ski for directing the ski sled and a steering handle such as used in a bicycle.

There have conventionally been available ski sleds of this kind, but many of them employ pipe frames for their structure, so that no cushioning action is provided, resulting in uncomfortable riding and poor stability. They are also heavy in weight, unshapely in appearance and therefore low in commercial value.

An object of the present invention is to eliminate these defects and to provide a ski sled which comprises a horizontally elongated main body having a substantially inverted U-shaped section and comprising a front portion having a head tube integrally embedded therein, a middle portion which the rider mounts and a rear portion; a runner composed of a horizontally elongated plate having layers of fiber reinforced plastics integrally bonded on both upper and lower surfaces thereof; a flexible plate connecting the lower end of said front portion of the main body and the foremost end of said runner; a substantially arc-shaped leaf spring connecting said rear portion of the main body and the rear portion of said runner, with said main body, runner and flexible plate being integrally laminated with fiber reinforced plastics; a steering shaft rotatably inserted in said head tube; a front ski for directing the ski sled supported by said steering shaft; and a steering handle secured to the upper end of said steering shaft.

Another feature of the present invention is to provide a ski sled which comprises a horizintally elongated main body having a substantially inverted U-shaped section and comprising a front portion having a head tube integrally embedded therein, a middle portion which the rider mounts and a rear portion; a runner composed of a horizontally elongated plate having layers of fiber reinforced plastics integrally bonded on both upper and lower surfaces thereof; a flexible plate connecting the lower end of said front portion of the main body and the foremost end of said runner; a substantially arc-shaped leaf spring connecting the rear end of said rear portion of the main body and the rear end of said runner, with said main body, runner, flexible plate and leaf spring being integrally laminated with fiber reinforced plastics; a pair of transversely extended foot-rests secured to the lower part of said front portion of the main body; a steering shaft rotatably inserted in said head tube; a front ski for directing the ski sled supported by said steering shaft; and a steering handle secured to the upper end of said steering shaft.

Still another feature of the present invention is to provide a ski sled which comprises a horizontally elongated main body having a substantially inverted U-shaped section and comprising a front portion having a head tube integrally embedded therein, a middle portion which the rider mounts and a rear portion; a runner composed of a horizontally elongated plate having layers of fiber reinforced plastics integrally bonded on both upper and lower surfaces thereof; a flexible plate connecting the lower end of said front portion of the main body and the foremost end of said runner; a substantially arc-shaped leaf spring connecting the rear end of said rear portion of the main body and the rear end of said runner, with said main body, runner, flexible plate and leaf spring being integrally laminated with fiber reinforced plastics; a steering shaft rotatably inserted in said head tube; a front ski for directing the ski sled supported by said steering shaft; a steering handle secured to the upper end of said steering shaft; and a couple of side skis fitted to the rider's feet.

Yet another feature of the present invention is to provide a ski sled which comprises a horizontally elongated main body having a substantially inverted U-shaped section and comprising a front portion having a head tube integrally embedded therein, a middle portion which the rider mounts and a rear portion; a runner composed of a horizontally elongated plate having layers of fiber reinforced plastics integrally bonded on both upper and lower surfaces thereof; a flexible plate connecting the lower end of said front portion of the main body and the foremost end of said runner, three members consisting of said main body, runner and flexible plate being integrally laminated with fiber reinforced plastics; a substantially arc-shaped leaf spring connecting said rear portion of the main body and the rear portion of said runner through set-screws; a pair of transversely extended foot-rests secured to the lower part of said front portion of the main body; a steering shaft rotatably inserted in said head tube; a front ski for directing the ski sled supported by said steering shaft; and a steering handle secured to the upper end of said steering shaft.

Still another feature of the present invention is to provide a ski sled which comprises a horizontally elongated main body having a substantially inverted U-shaped section and comprising a front portion having a head tube integrally embedded therein, a middle portion which the rider mounts and a rear portion; a runner composed of a horizontally elongated plate having layers of fiber reinforced plastics integrally bonded on both upper and lower surfaces thereof; a flexible plate connecting the lower end of said front portion of the main body and the foremost end of said runner, with said main body, runner and flexible plate being integrally laminated with fiber reinforced plastics; a substantially arc-shaped leaf spring connecting said rear portion of the main body and the rear portion of said runner through set-screws; a steering shaft rotatably inserted in said head tube; a front ski for directing the ski sled supported by said steering shaft; a steering handle secured to the upper end of said steering shaft; and a couple of side skis fitted to the rider's feet.

Yet another feature of the present invention is to provide a ski sled which comprises a horizontally elongated main body having a substantially inverted U-shaped section and comprising a front portion having a head tube integrally embedded therein, a middle portion which the rider mounts and a rear portion; a runner composed of a horizontally elongated plate having layers of fiber reinforced plastics integrally bonded on both upper and lower surfaces thereof; a flexible plate connecting the lower end of said front portion of the main body and the foremost end of said runner, with said main body, runner and flexible plate being integrally laminated with fiber reinforced plastics; a substantially arc-shaped leaf spring connecting said rear portion of the main body and the rear portion of said runner; a steering shaft having a bore, said steering shaft being inserted only rotatably in said head tube; a sliding axle inserted in said bore of the steering shaft in such manner that it may slide therein only axially from the bottom end thereof; a coil spring between a collar at the lower part of said sliding axle and a flange at the bottom end of said steering shaft; a front ski for directing the ski sled, said front ski being rotatably supported by a transversely extended pin at the bottom of said sliding axle; a steering handle secured to the upper end of said steering shaft; and a pair of side skis fitted to the rider's feet.

The invention will next be explained in more detail with reference to the accompanying drawings, in which FIGURE 1 is a longitudinal sectional view of one embodiment of the present invention;

Figure 1:
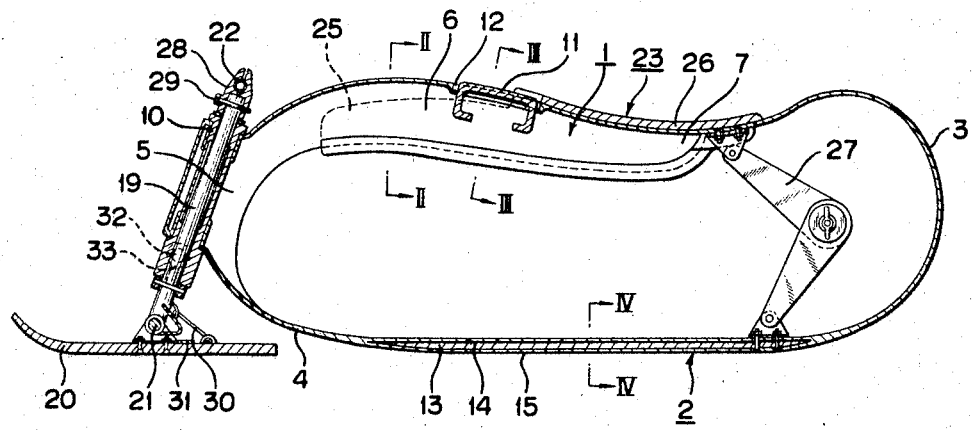
Figure 2:
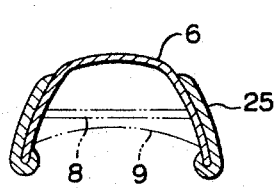
FIGURE 2 is a sectional view as taken along the line II—II of FIG. 1.
Figure 3:
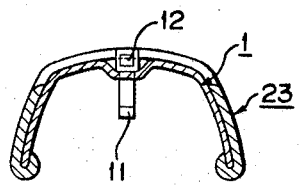
FIGURE 3 is a sectional view as taken along the line III—III of FIG. 1.

In the embodiment shown in FIGS. 1 to 5, the frame consists of an upper main body 1, a runner 2, a leaf spring 3 and a flexible plate 4 which are integrally molded in lamination with fiber reinforced plastics so as to form generally a loop-like configuration. As plastics, usually a polyester resin or epoxy resin is used, while as the reinforcing fiber, glass fiber, synthetic fiber, metal fiber or the like may be used.

The main body 1 comprises a front portion 5, a middle portion 6 formed to provide a pair of knee-grips and a rear portion 7 to provide a seat. The basic sectional configuration of said body is substantially ∩-shaped as shown, for example, in FIGS. 2 and 3, and if necessary, it may be reinforced with a stiffener 8 or a rib 9, or otherwise the interior space may be filled with a hard foam material, thereby to provide sufficient stiffness. In molding lamination, a head tube 10 is embedded in the front portion 5. Numeral 12 indicates a recess receiving the handgrip 11 for carrying the sled.

Figure 4:
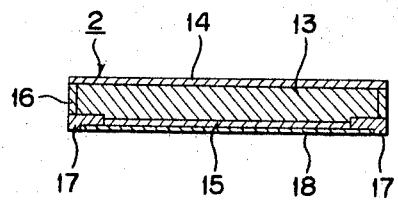
FIGURE 4 is a sectional view as taken along the line IV—IV of FIG. 1.

The structure of the runner 2 is basically the same as the structure of the fiber reinforced plastic-made ski and is provided with greater stiffness than the leaf spring 3 and the flexible plate 4. FIG. 4 exemplifies a sectional structure of the runner 2. It will be seen that the core 13 made of wood, a hard foam material or the like has been laminated on its upper face with an upper layer 14 of fiber reinforced plastics and on its lower face with a lower layer 15 of reinforced plastics. Numeral 16 denotes a flank plate made of water-proof material. At both sides of the lower face are secured steel edges 17 by means of wood screws or the like. On the bottom face of the lower layer 15 may be bonded a facing sheet 18 made of polyethylene, ethylene tetrafluoride or the like so as to improve the sliding performance of the sled. The strength of the runner 2 due for the most part to the upper and lower layers 14, 15 of fiber reinforced plastics, so that in the forming of the lamination thereof, if the fibers at the surfaces are evenly orientated in the lengthwise direction of the runner 2, in other words, if a lengthwire orientation is given to the surface layers, the runner 2 will be provided a sufficiently large bending strength.

The leaf spring 3 is adapted to connect the rear end of the main body 1 and the rear end of the runner 2. The cushioning action of the present ski sled is mainly provided by this leaf spring 3. Said leaf spring 3 is a strip plate forming a segment of a circle molded in lamination with fiber reinforced plastic, and is an extension of the upper and lower layers 14, 15 of fiber reinforced plastics of the runner 2 and the rear portion 7 of the main body 1. It is preferable to give an orientation in the lengthwise direction to the surface layers, as in the case with the runner 2.

The flexible plate 4 is provided to connect the lower end of the front portion 5 of the main body 1 and the front end of the runner 2. Although its structure is identical to that of the leaf spring 3, its function is completely different. Namely, the flexible plate 4 is a member which acts as a joint in case of mutual swinging motion of the main body 1 and the runner 2 both having greater stiffness, so that it is required to have much larger flexibility than the body 1 and the runner 2. If this flexible plate 4 is not provided, it is impossible to obtain sufficiently soft cushioning action, and the excessively stress-concentrated parts may be produced, and the large deformation of the runner 2 may be produced, so that no stable sliding performance nor comfortable riding can be achieved.

I will also be seen that a steering shaft 19 is rotatably inserted in the head tube 10 embedded in the front portion 5 of the main body 1, and at the upper end of said steering shaft is secured a steering handle 22 by screws 29 through a handle bracket 28. At the bottom end of the steering shaft 19 is swingably fitted a front ski 20 for directing the sled by a lateral pin 21, whereby excellent load holding is attained. The front ski 20 is completely identical to an ordinary ski except that the former has shorter length. The rubber string 30 and the rubber pad 31 both act as limiters for the front ski 20 which keep the front ski 20 from turning widely in case of jumping or on other occasions, thus preventing overturn of the sled at the time of landing. A pair of foot-rests 33 are fitted, either by screws or by welding, to the foot-rest seat 32 at the lower part of the head tube 10 embedded in the front portion 5 of the main body. The main body 1 is also provided, by binding or by other means, with a cover 23 which serves both as the knee-grips 25 and as the seat 26. There may also be provided a friction damper 27 in parallel to the leaf spring 3, whereby an even more comfortable feeling in riding and better stability will be attained.

Figure 5:
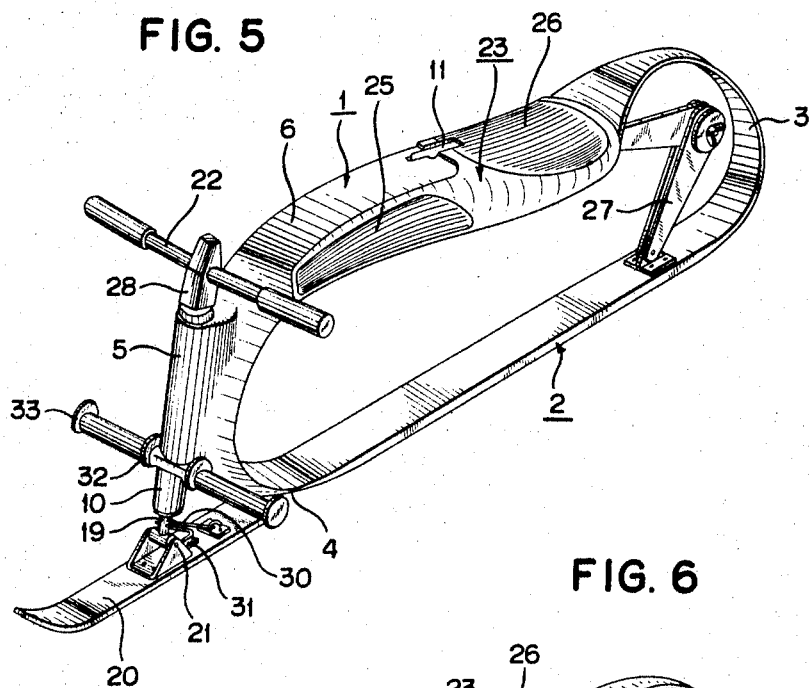
FIGURE 5 is a perspective view of the embodiment of FIG. 1.
Figure 6:
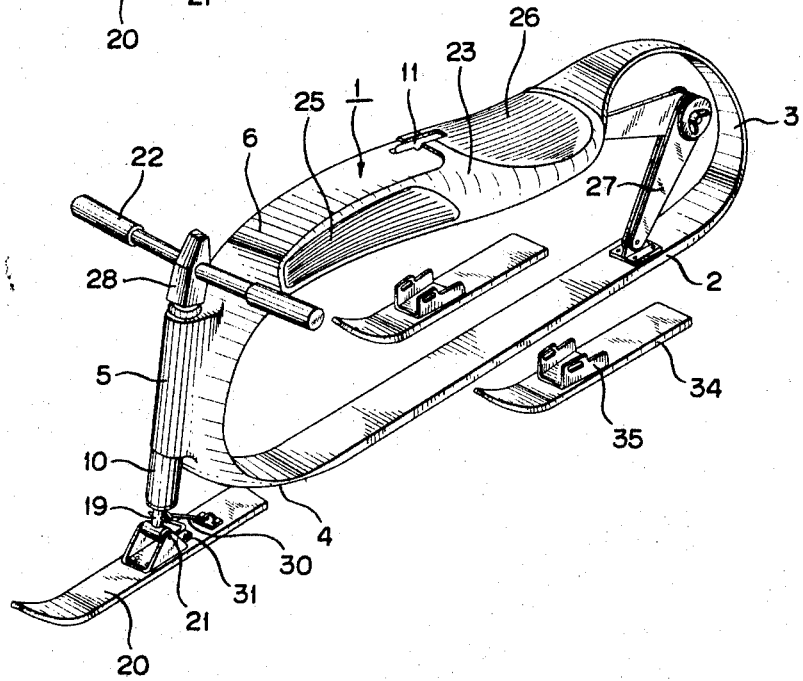
FIGURE 6 is a perspective view of another embodiment of the present invention.

In FIG. 6 is shown another embodiment of the present invention, in which no foot-rest seat 32 and foot-rests 33 as shown in FIG. 5 are provided. Instead, the rider wears on his feet the side skis 34 which are completely the same as an ordinary ski except for extreme shortness of the entire length of the former. The side skis 34 are fitted to the rider's shoes by ordinary ski-bindings.

Figure 7:
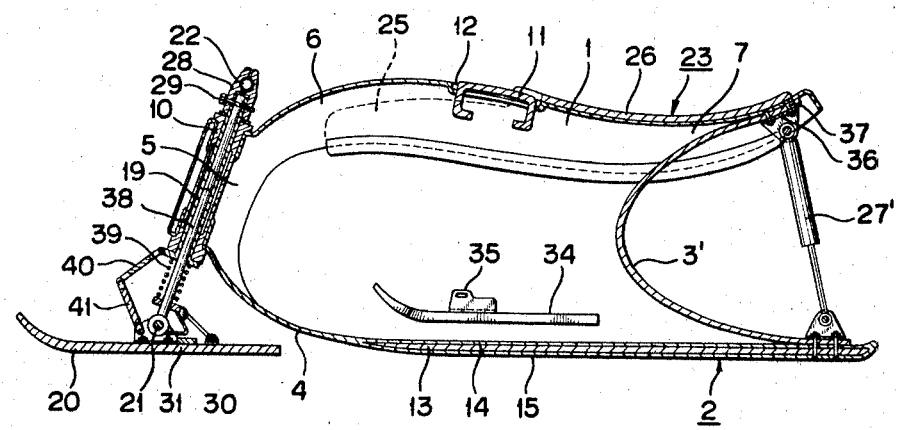
FIGURE 7 is a longitudinal sectional view of still another embodiment.

FIG. 7 illustrates still another embodiment of the present invention. In this embodiment, instead of intergrally coupling the leaf spring 3 to the rear portion of the main body 1 and to the rear portion of the runner 2 to form a loop-like configuration as shown in FIG. 1, there is provided a separate leaf spring 3' which is connected to the rear portion of said body 1 and to the rear portion of said runner 2, respectively, by means of plates 36 and screws 37, and the cushioning action of the sled is provided mainly by this leaf spring 3'. In this case, the leaf spring 3' may be composed of either metal or fiber reinforced plastics. If the arc-shaped leaf spring 3' is arranged in a direction as shown in FIG. 7, it is possible to elongate the full length of the runner 2 as compared with that in the embodiment of FIG. 1. It will also be seen that a steering shaft 19 is rotatably inserted in the head tube 10 embedded in the front portion 5, and at the upper end of said shaft 19 is mounted a steering handle 22 which is secured by screws 29 through a handle bracket 28. At the bottom end of the steering shaft 19 is swingably mounted a front ski 20 for directing the sled, said front ski being secured by a lateral pin 21. This arrangement permits excellent load holding performance of the ski. There are also provided a rubber string 30 and a rubber pad 31 which act as limiters of the front ski 20 and prevent the front ski 20 from turning widely in case of jumping, thus assuring safe landing with no fear of overturning of the sled. Front cushioning in the present embodiment is offered by a coil spring 39 coiled around the lower part of a sliding axle 38 provided in the inside of the steering shaft 19, with the front ski 20 being mounted at the end of said sliding axle 38. The steering rotatary motion of the steering shaft 19 is transmitted through links 40, 41 to the front ski 20. A telescopic hydraulic damper 27' provided in parallel arrangement to the leaf spring 3' will guarantee even more comfortable riding with increased stability. In this embodiment, the rider wears on his feet the side skis 34 which are completely same as an ordinary ski except for extremely short length of said side skis. These side skis are fitted to the rider's shoes by using conventional ski-bindings 35.

Figure 8:
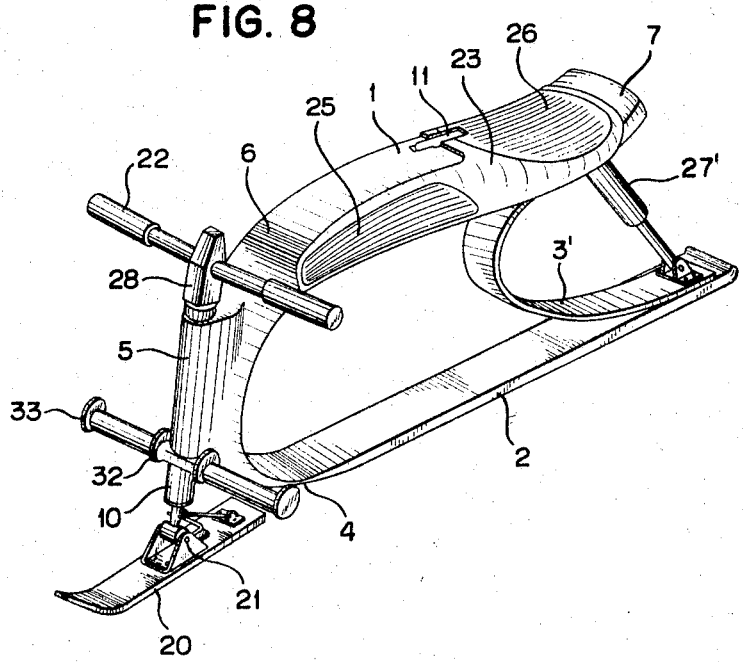
FIGURE 8 is a perspective view of yet another embodiment of the present invention.

FIG. 8 shows yet another embodiment in which, instead of providing a frictional damper 27 inside of the leaf spring 3 as shown in FIG. 5, a telescopic hydraulic damper 27' is provided outside of the separate leaf spring 3', thereby to effectively improve comfortable feeling in riding and stability of the sled.

The ski sled according to the present invention is composed as described above. Thus, as the frame of the present ski sled, unlike the conventional ones, is composed of a loop-shaped structure including a leaf spring and a flexible plate, although it provides excellent cushioning effect during riding. It is possible to enlarge torsional rigidity of the structure, thus assuring extremely comfortable ride and stability.

It should be also noted that, in the frame of the present invention, the merits resulting from the reinforced plastic laminated structure are displayed to its full scope; it made possible to realize a structure where the parts having different functions from each other, such as the main body, the runner and the flexible plate, are composed integrally, thus remarkably enhancing the productivity of the sled in spite of its complicated configuration. It also became possible to obtain a form which provides coziness to the rider and adds beauty to the appearance of the sled, resulting in enhanced commercial value thereof.

Also, in the present invention, since a steering means comprising the front portion of the body and the steering handle and a narrow elongated runner are used, it is possible to make a variety of movement, such as a sharp turn effected by slanting the sled crosswise and utilizing edging thereof, which were unable to do with the conventional ski sleds. Moreover, the snugly fitting feeling derived from the above-said advantageous shape of the frame will add further variety to the capability of movements of the sled. Thus, all these elements put together provide an ideal ski sled that gives to the rider plenty of sporting pleasure.

What I claim is:

1. A ski sled comprising a main body the entire length of which is substantially of inverted U-shaped cross-section, a front ski, a runner, and a steering shaft; said main body being of relatively rigid construction and including a front portion supporting said steering shaft, a middle portion and a rear portion; a flexible plate, said front portion of the main body and said runner respectively including a bottom end and a front end connected by said flexible plate which is substantially more flexible than said main body and runner; a leaf spring, said rear portion and runner including rear ends connected by said leaf spring; said front ski being connected to said steering shaft; and a steering handle on said shaft.

2. A ski sled as claimed in claim 1, wherein said main body, flexible plate and runner are of an integral strip of fibre reinforced plastic.

3. A ski sled as claimed in claim 2, wherein said strip further includes said leaf spring.

4. A ski sled as claimed in claim 3 comprising a damper between said rear ends.

5. A ski sled as claimed in claim 4, wherein the damper means is a friction damper.

6. A ski sled as claimed in claim 4, wherein the damper means is a telescopic hydraulic damper.

7. A ski sled as claimed in claim 3 comprising foot rests on said front portion.

8. A ski sled as claimed in claim 3 comprising side skis on opposite sides of said runner and including shoe binding means.

9. A ski sled as claimed in claim 2, wherein said front portion is a substantially vertical part with said middle and rear portions extending substantially rearwardly and horizontally therefrom, said flexible plate and leaf spring providing for displacement of said runner relative to said main body, said main body including a seat having a substantially constant attitude with respect to said steering handle.

10. A ski sled as claimed in claim 9 comprising a handle displaceably mounted on said main body and adapted for concealed and extended positions relative thereto.

11. A ski sled as claimed in claim 9 comprising a horizontal pin connecting said front ski to said steering shaft and means limiting the movement of the front ski on said shaft.

12. A ski sled as claimed in claim 9, wherein said runner comprises a core, upper and lower layers of fibre reinforced plastic on said core, flank plates of waterproof material on said core, and steel edges on opposite sides of said lower layer.

13. A ski sled as claimed in claim 9, wherein part of the inverted U-shaped cross-section of the main body is in the form of knee grips.

14. A ski sled as claimed in claim 9, wherein the middle and rear portions of the main body and the runner and leaf spring are located in entirety behind the front portion of the main body.

References Cited

UNITED STATES PATENTS

| | | | |
|---|---|---|---|
| 1,462,889 | 7/1923 | Slater | 280—16 |
| 2,528,397 | 10/1950 | Stof | 280—16 |
| 2,817,101 | 12/1957 | Chaffee | 280—16 X |
| 3,178,196 | 4/1965 | Colace | 280—16 |
| 3,325,179 | 6/1967 | Bissett | 280—25 |

LEO FRIAGLIA, Primary Examiner.

JOEL E. SIEGEL, Assistant Examiner.

U.S. Cl. X.R.

280—21, 25